UNITED STATES PATENT OFFICE.

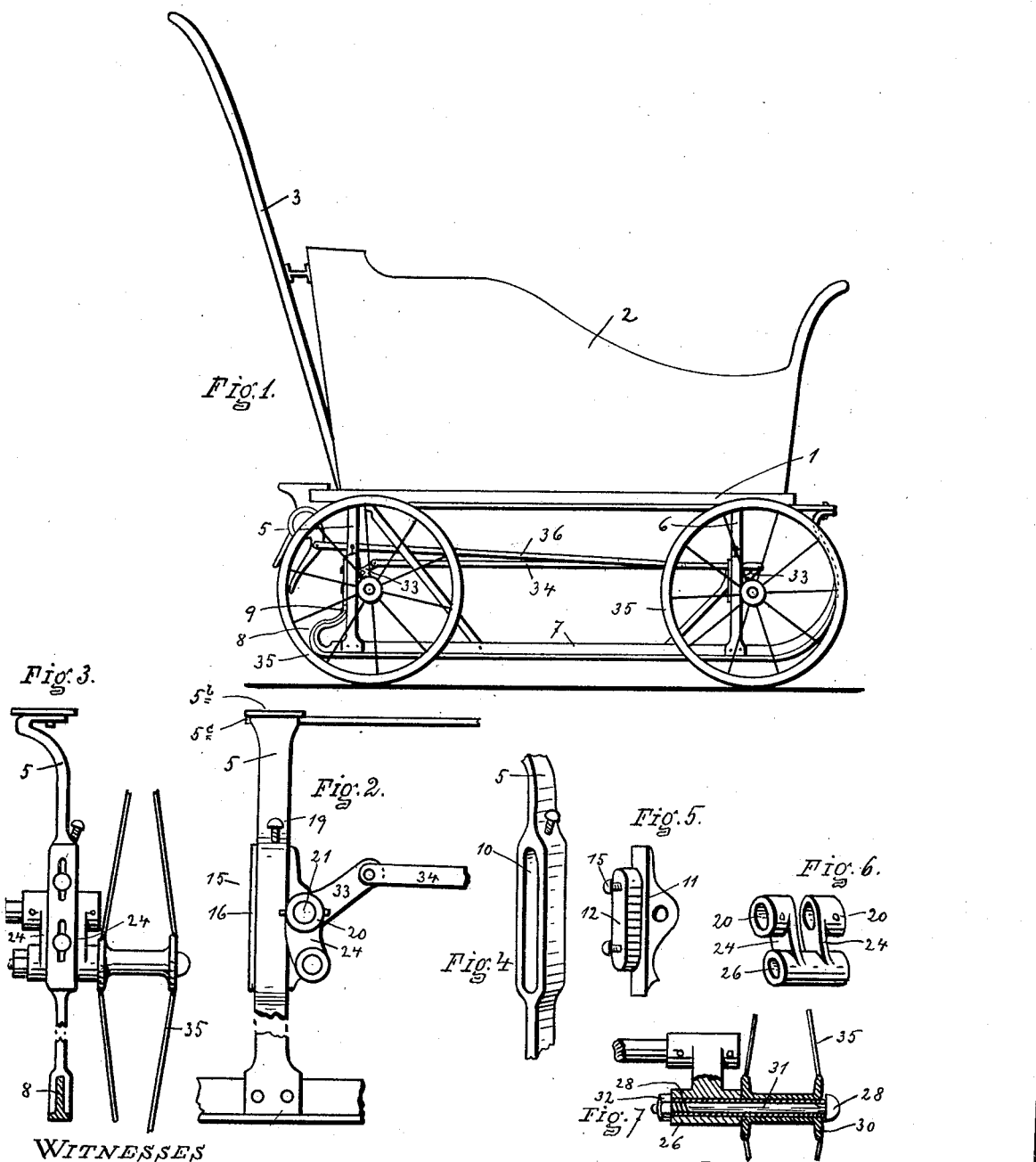

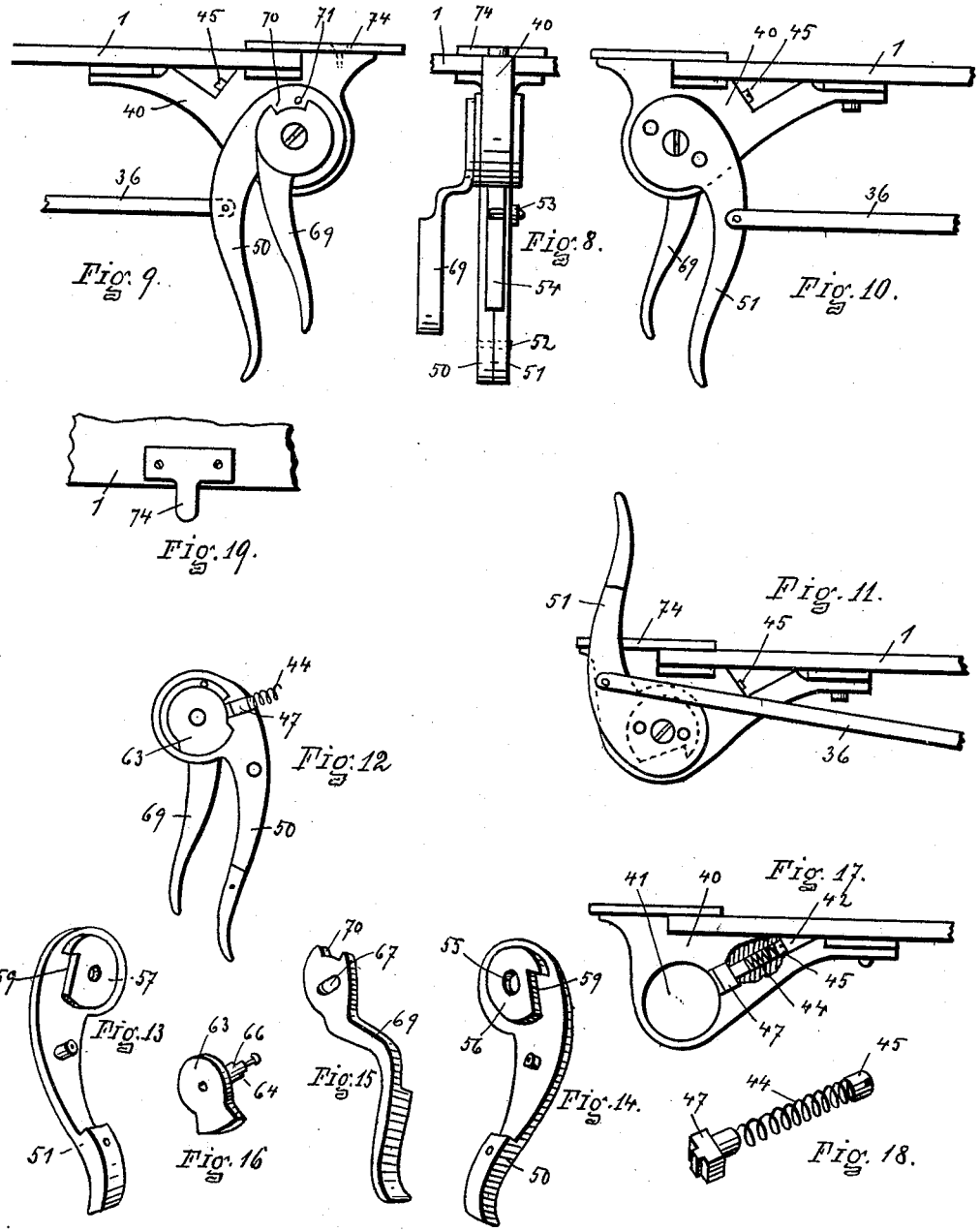

JOHN G. RAITHEL, OF LITTLE FALLS, NEW YORK.

CONVERTIBLE SLEIGH AND GO-CART.

1,056,938.  Specification of Letters Patent.  Patented Mar. 25, 1913.

Application filed December 20, 1909. Serial No. 534,159.

*To all whom it may concern:*

Be it known that I, JOHN G. RAITHEL, a citizen of the United States, residing at Little Falls, in the county of Herkimer and State of New York, have invented certain new and useful Improvements in Convertible Sleighs and Go-Carts, of which the following is a specification, reference being had therein to the accompanying drawing.

My invention relates to a convertible sleigh and go-cart, and I declare that the following is a full, clear, concise and exact description of the same, sufficient to enable one skilled in the art to make and use the same, reference being had to the accompanying drawings in which like reference characters refer to like parts throughout.

The invention comprises a vehicle provided with runners and wheels, the latter of which, by manipulation of certain means, can be brought into operative position and securely locked therein, the means for effecting this also comprising means by which, upon release of the lock, the wheels can be swung out of position so that the vehicle travels on the runners.

There are several details of the invention which will appear from the following description with reference to the drawings.

In the drawings, Figure 1 is a side view of the device with the wheels in operative position; Fig. 2 is a side view of a portion of the device, showing a knee of the sled runners with certain parts of the wheel mountings thereon; Fig. 3 is a rear view of the parts shown in Fig. 2 and showing the position of the wheel when down; Fig. 4 is a perspective view of a portion of the knee; Fig. 5 is a like view of the wheel-carrying block supported in the knee; Fig. 6 is a detail of a part mounted on the block shown in Fig. 5 by which the wheels are raised or lowered; Fig. 7 is a rear view of the wheel-carrying member, partially in section; Fig. 8 is a view from the rear of the operating and locking mechanisms, while Fig. 9 is a view from the left in Fig. 8, and Fig. 10 is a view from the right, the three latter figures showing the device in position where the wheels are locked down; Fig. 11 is a view of the said parts in the position occupied when the wheel is locked up. Fig. 12 is a side view of portions of said locking mechanism, and Fig. 13 is a perspective view of one portion of said locking mechanism, Fig. 14 of the companion, and Figs. 15 and 16 are like views of intermediate parts; Fig. 17 is a side view, parts broken away, with the frame that supports the parts last referred to, and Fig. 18 is a perspective view of the locking dog with spring connected therewith. Fig. 19 is a partial plan view of the rear of the sleigh, showing means for securing the locking members in the upper position.

Referring to the figures in detail, 1 is the frame of the vehicle with box 2 and handles 3. It is provided with knees 5 and 6, (with connecting bars 5ᵃ and 6ᵃ overhung as at 5ᵇ and 6ᵇ to prevent springing of the knees) which carry the runners 7 which are of ordinary form and suitably braced, with the exception, however, that the rear end of the runner, as at 8, is bent upwardly in prong 9 which bears against the knee and serves to stiffen the frame and brace it against wrenching when it is traveling on the runners and occasion requires tilting of the vehicle so that it travels on the rear ends of the runners. The knees have a peculiar construction or formation particularly shown in Fig. 4. They are preferably formed with a vertical slot, indicated at 10, in which is mounted the block 11, Fig. 5, the portion 12 of said block resting in the slot in the knee and vertically movable therein so as to adjust the wheel members which are carried by the block to bring them to a level to raise or lower the entire set. The portion 12 is bored for screws 15 and a plate 16 is provided which overlaps the edges of the slot 10 and is itself slotted, as seen in Fig. 3, for the screws 15, by which the block is held tightly in place by the bearing of screw-heads on the plate 16. A screw 19 is placed in the knee and extends into the slot to bear against the portion 12 of the block 11 and hold it downward against the tendency of upward pressure which is exerted by the weight of the vehicle. The block 11 carries a yoke 20 by means of a shaft or rod 21 which extends through apertures 22 in the yoke and across the vehicle into a similar yoke on the other side.

It will be understood that the construction just described is identical in the four knees of the vehicle. The yoke is secured to the shaft 21 and is formed with two oppositely disposed wrists 24 which are spaced a distance slightly greater than the thickness of the block 21 so that the faces of the wrists bear against the faces of the block and knee when the yoke is in downward position, as indicated in Fig. 6. At the end of the yoke is a sleeve 26. Into the sleeve is securely fastened a tubular member 28 which at one side extends outwardly a distance substantially equal to the length of the bore of the hub 30. A bolt 31 passes through the tubular member with its head bearing against the hub and at the other end having a nut 32 whereby wear can be taken up and the wheel kept from rattling.

On the shaft 21 and between the rear wheels, as here shown, is an arm 33 secured on the shaft. A rod 34 connects the end of this rod 33 with a corresponding arm at the forward end of the vehicle, so that the reciprocation of rod 34 operates the several yokes synchronously. The rod 36 is connected at one end to the rod 34 and extends rearwardly to a point of connection with the device for operating the said rods to raise or lower the wheels 35 and lock them in given position. A rear view of this device is shown in Fig. 8. It comprises a block 40 mounted on the platform or other suitable member of the vehicle. The block is transversely bored providing aperture 41. A bore 42 is provided which passes through the block and intercepts the bore 41. In this last bore is mounted the spring 44 which at one end is connected to the screw-bolt 45 screwed into the block 40 and adapted to increase or reduce the tension on spring 44. At the other end of the spring 44 is bolt 47 of the form shown in Fig. 18 and which is held in projection, as indicated in Fig. 17, by force of the spring 44. The members which operate the device comprise two lever members 50 and 51, secured by screw 52 and by bolt and nut shown at 53. Each is cut out oppositely so that when assembled an intermediate space, as at 54, is left, and by means of bolt 53 the opposite portions of members 50 and 51 can be brought more or less closely together. Members 50 and 51 are formed to be mounted in block 40, this conformation consisting of a disk 56 on member 50 and 57 on member 51, being counterparts and each having a cutout, shown in each instance at 59, wherein the lock or bolt 47 rests when the members 50 and 51 as a unit are turned into a certain position, this position being such as shown in Fig. 1 where the wheels are down and wherein the bolt 47 prevents the members 50 and 51 from being turned upwardly into the position shown in Fig. 11 which would operate the mechanism to raise the wheels. The parts 50 and 51 are held in place in block 40 by bolt 53 and screw 52 clamping them together in position, but between them is inserted a cam 63, Figs. 16 and 12, in such a position relative to the parts 50 and 51 as indicated in Fig. 12 where a portion of the bolt 47 is shown. The cam 63 has at one side a stud 64 which passes through the bore 55 in member 50, the end of the stud being squared, as at 66, to be engaged in the slot 67 in the release lever 69. This release lever is mounted against the face of member 50 and is partly cut away, as shown at 70, to be engaged by pin 71 which limits its movement. It will thus be apparent that when the parts are assembled members 50 and 51 move together and may be locked in a given position, as seen in Fig. 1, by bolt 47, and that the movement of the release lever 69 swings the cam 63 independently of the movement of the locking members described, so that the cam crowds the bolt 47 out of its locking engagement. When the parts are unlocked and swung upward the weight of the vehicle raises the wheels relatively to the body and the members 50 and 51 engage with the walls of the block 40 and the sides of plate 74 extending rearwardly from the body of the sleigh.

In the operation of the device it may be supposed that the parts in the position shown in Fig. 1, the release lever 69 will be pressed forwardly which will swing the cam 63 and press the lock 47 backward, at which time the members 50 and 51, which may be called locking levers, can be swung with the release lever 69 so as to operate the mechanism to raise the wheels and bring the vehicle to rest on the runners, when the locking levers will be held by the walls of block 40 and the plate 74. Conversely, the two levers may be swung downwardly by the foot and far enough for the bolt 47 to engage in the cutout 59 which will bring the wheels into carrying position. Pressure of the foot on the release lever 69 will unlock the mechanism and the weight of the vehicle will raise the wheels and turn the levers so that they can readily be pushed by the foot into upright locking position.

Having described my invention, what I claim as new and desire to secure by Letters Patent, is:

1. A convertible vehicle comprising a frame having fixed knees and runners, the knees being placed, one at each corner of the vehicle, and having the runners mounted at the lower ends of the same and being formed with an elongated space in each, wheel-carrying and positioning mechanism supported in the space in said knees, said mechanism being secured with vertical adjustment in said space.

2. A convertible vehicle having a frame comprising knees and runners, blocks vertically mounted in the knees, yokes swingably mounted on the blocks and having faces engaging the blocks to provide against lateral yield, the said yokes carrying wheel members and being swingable to raise or lower the wheels, substantially as described.

3. A convertible vehicle having a frame, yokes vertically and adjustably mounted in the frame, the said yokes being provided with a sleeve, a tubular member secured in the sleeve and extending therefrom and adapted to receive the hub of a wheel, a bolt passing through the tubular member whereby to secure the wheel in place on the said tubular member, substantially as described.

4. A device of the character described having a frame comprising oppositely placed knees at the front and at the rear and runners secured to the knees, front and rear pairs of wheels swingably mounted on the said knees each wheel being separately adjustable vertically on its corresponding knee, means connecting the wheels whereby all may be moved to a given plane synchronously, and a latch, substantially as shown and described, locking the wheels in carrying position, substantially as described.

5. In a convertible vehicle, the combination with sled runners and knees, means supporting wheels on the knees and means whereby to swing the wheels upwardly and downwardly synchronously, of lever members adapted to swing the wheels downwardly and lock and unlock them, said lever members including a swinging device with interior disks having a cutout, a spring bolt projecting into said cutout and holding said device, a release cam between the disks and adapted to displace the bolt and a lever mounted in conjunction with the release cam to swing it into bolt-displacing position by the operation of which members the wheels are locked in downward position or unlocked to be raised.

6. In a convertible vehicle, the combination with a frame with runners and wheel members mounted thereon to be swung upward or downward, of locking means for securing the wheels in given position, the same comprising oppositely facing locking levers adapted to receive a spring bolt, a cam mounted between the locking levers and means for operating the cam to unlock the bolt, substantially as described.

7. In a convertible vehicle, the combination of fixed runners and wheels mounted on front and rear axles, said axles, lever means connecting the axles whereby to raise or lower them synchronously, foot-operative latch-means whereby to actuate the lever means and lock them, consisting of oppositely placed disks with extensions for rotating them, a lock holding the disks in a given position and a cam mounted concentrically with the disks and having an extension for rotating it whereby to release the lock.

8. In a convertible vehicle, the combination with sled-runners, wheels, and means to press the wheels into carrying position, of means to lock them in such position, said means consisting of a disk-lever having a cutout, a spring-bolt playing into said cutout, and a cam member concentrically mounted with the disk-lever by the turning of which cam-member to press the spring-bolt out of the cutout in the disk-lever.

9. In a convertible vehicle, a frame, runners and knees in front and rear pairs, the knees being severally slotted vertically, blocks in the slot, swinging yokes on the blocks and axles in the yokes, means connecting the yokes whereby to raise or lower the axles, and a locking lever connected with said yoke-connecting means to secure the axles in given position.

In testimony whereof I hereunto affix my signature in the presence of two witnesses.

JOHN G. RAITHEL.

Witnesses:
ARTHUR W. HYDE,
F. ALBERT MINER.

---

Copies of this patent may be obtained for five cents each, by addressing the "Commissioner of Patents, Washington, D. C."